United States Patent
Wang et al.

(10) Patent No.: US 10,146,069 B2
(45) Date of Patent: Dec. 4, 2018

(54) DISPLAY AND FABRICATING METHOD THEREOF, AND FABRICATING METHOD OF PHOTOSENSITIVE FILM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhiyong Wang, Beijing (CN); Hong Zhu, Beijing (CN); Hailin Xue, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 15/149,635

(22) Filed: May 9, 2016

(65) Prior Publication Data
US 2017/0075151 A1    Mar. 16, 2017

(30) Foreign Application Priority Data
Sep. 11, 2015    (CN) .......................... 2015 1 0580394

(51) Int. Cl.
*G02F 1/01*    (2006.01)
*G02F 1/1335*  (2006.01)

(52) U.S. Cl.
CPC .......... *G02F 1/0126* (2013.01); *G02F 1/1335* (2013.01); *G02F 1/133555* (2013.01)

(58) Field of Classification Search
CPC ............. G02F 1/0126; G02F 1/133555; G02F 1/1335; B60Q 1/2665
See application file for complete search history.

(56) References Cited

U.S. PATENT DOCUMENTS

| | | | | |
|---|---|---|---|---|
| 6,084,647 A | * | 7/2000 | Hatano | G02B 27/26 348/E13.033 |
| 2002/0163616 A1 | * | 11/2002 | Jones | G02F 1/1339 349/154 |

(Continued)

FOREIGN PATENT DOCUMENTS

| CN | 1512479 A | 7/2004 |
|---|---|---|
| CN | 101059609 A | 10/2007 |

(Continued)

OTHER PUBLICATIONS

Office Action from corresponding Chinese Application No. 201510580394.7, dated Mar. 24, 2017 (8 pages).

*Primary Examiner* — Kevin Quarterman
(74) *Attorney, Agent, or Firm* — Harness, Dickey & Pierce, P.L.C.

(57) ABSTRACT

The embodiments of the present disclosure provide a display and a fabricating method thereof, and a fabricating method of a photosensitive film. The display comprises: a display screen for displaying a picture, and a photosensitive film disposed on a light emergent surface of the display screen, wherein the photosensitive film is configured to automatically adjust corresponding transmittance according to a gray level brightness of the picture displayed by the display screen, and the transmittance of the photosensitive film increases with the increase of the gray level brightness of the picture displayed by the display screen. The display provided by the embodiment of the present disclosure can increase the contrast ratio without changing the existing design, thereby improving the display effect of the display.

19 Claims, 3 Drawing Sheets

(56) References Cited

U.S. PATENT DOCUMENTS

| | | | |
|---|---|---|---|
| 2003/0038912 A1* | 2/2003 | Broer | C09K 19/00 349/122 |
| 2004/0150602 A1 | 8/2004 | Furukawa et al. | |
| 2005/0057701 A1 | 3/2005 | Weiss | |
| 2005/0140907 A1* | 6/2005 | Yun | G02F 1/133514 349/144 |
| 2005/0184952 A1 | 8/2005 | Konno et al. | |
| 2006/0139749 A1 | 6/2006 | Watanabe et al. | |
| 2007/0247415 A1 | 10/2007 | Yasunaga | |
| 2009/0290369 A1 | 11/2009 | Schofield et al. | |

FOREIGN PATENT DOCUMENTS

| | | |
|---|---|---|
| CN | 104793423 A | 7/2015 |
| JP | 2012185497 A | 9/2012 |

\* cited by examiner

DISPLAY AND FABRICATING METHOD THEREOF, AND FABRICATING METHOD OF PHOTOSENSITIVE FILM

CROSS-REFERENCE TO RELATED APPLICATION

This application claims the benefit and priority of Chinese Patent Application No. 201510580394.7 filed Sep. 11, 2015. The entire disclosure of the above application is incorporated herein by reference.

FIELD

The present disclosure relates to the field of display techniques, and particularly, to a display and a fabricating method thereof, and a fabricating method of a photosensitive film.

BACKGROUND

This section provides background information related to the present disclosure which is not necessarily prior art.

Currently, the display technique is widely used in televisions, cellular phones, and public information displaying. The display for displaying pictures is energetically popularized due to its advantages of ultra-thin and energy-saving. In which, the contrast ratio of the picture displayed by the display has a crucial influence on the visual effect. Generally speaking, the image is clearer and more striking and the color is brighter and more beautiful when the contrast ratio increases, while the definition of the whole picture will be affected when the contrast ratio decreases. A high contrast ratio is very helpful to the definition, detail, gray level, etc. of the image. In the aspects of such as text displaying and black-and-white photo displaying with a large black-and-white contrast, a product with a high contrast ratio is advantageous in color contrast, definition, integrity, etc. In addition, the contrast ratio has a larger influence on display effect of the dynamic video. Since the conversion between brightness and darkness in the dynamic image is quick, such a conversion can be distinguished more easily by human eyes when the contrast ratio increases. Thus it is a key to increase the contrast ratio of the display screen along with the increasingly high requirement of the quality of the picture displayed by the display.

In addition, with the improvement of the scientific and technological level, the on-board display technique is continuously developed, the demand on the on-board display in vehicles increasingly rises, and the on-board rearview mirror display has become a configuration for high-end vehicles. The vehicle rearview mirror display is also referred to as on-board rearview mirror display, which is a display mounted on the vehicle rearview mirror. When the display is turned on, it partially serves as a display, and partially services as a rearview mirror. When the display is turned off, the whole screen serves as a rearview mirror. Thus the rearview mirror display shall ensure the normal working of the reflection mirror while partially displaying. When a black picture is to be displayed, the display shall be dark enough to ensure that the light emitted by the display does not influence the use of the reflection mirror. Thus, the on-board rearview mirror display requires increasing the contrast ratio of the display screen, so as to meet the displaying requirement thereof.

Therefore, it is a technical problem urgently to be solved by those skilled in the art to increase the contrast ratio of the display, so as to improve the display effect of the display.

SUMMARY

This section provides a general summary of the disclosure, and is not a comprehensive disclosure of its full scope or all of its features.

The embodiments described herein provide a display and a fabricating method thereof, and a fabricating method of a photosensitive film, so as to provide a display with a high contrast ratio, thereby improving the display effect of the display.

In one embodiment described herein, a display comprises a display screen for displaying a picture, and a photosensitive film disposed on a light emergent surface of the display screen. The photosensitive film is configured to automatically adjust corresponding transmittance according to a gray level brightness of the picture displayed by the display screen, and the transmittance of the photosensitive film increases with the increase of the gray level brightness of the picture displayed by the display screen.

In a possible implementation, a gray level brightness of the picture displayed by the display is a product of the gray level brightness of the picture currently displayed by the display screen and the adjusted transmittance of the photosensitive film.

In a possible implementation, the brightness of the picture displayed by the display is obtained from the following equation:

$$I'_{GL} = I_{GL} \times Tr_{GL} = I_{GL} \times f(I_{GL}) = \left(\frac{GL}{256}\right)^r \times I'_{255} = \left(\frac{GL}{256}\right)^4 \times I_{L255} \times Tr_{L255}$$

wherein, $I'_{GL}$ is the gray level brightness of the picture currently displayed by the display, $I_{GL}$ is the gray level brightness of the picture currently displayed by the display screen, $I'_{L255}$ is a brightness of a white picture displayed by the display, $I_{L255}$ is a brightness of the white picture displayed by the display screen, $Tr_{GL}$ is the transmittance of the photosensitive film, $Tr_{L255}$ is a transmittance of the photosensitive film corresponding to the white picture, $\gamma$ is a gamma value, and GL is a gray level value of the displayed picture.

In a possible implementation, the material of the photosensitive film is a liquid crystal material.

In a possible implementation, the liquid crystal material has the photosensitive characteristic under the effect of photocatalyst through visible light irradiation.

In a possible implementation, a thickness of the photosensitive film is not more than 100 um.

In a possible implementation, the photosensitive film is attached to the light emergent surface of the display screen through an adhesive tape or a bonding agent.

In a possible implementation, the display further comprises a semi-transmission and semi-reflection mirror fixed on the photosensitive film.

In a possible implementation, the semi-transmission and semi-reflection mirror is fixed on the photosensitive film through a bonding agent or a framework.

In a possible implementation, the display is an on-board rearview mirror display or a clock display.

In another embodiment described herein, a fabricating method of a photosensitive film for the display comprises:

forming the photosensitive film with a small organic molecular material including rigid and flexible groups, wherein a transmittance of the small organic molecular material increases with the increase of a gray level brightness of a picture displayed by a display screen of the display under the effect of photocatalyst.

In a possible implementation, relations among a transmittance of the photosensitive film, a gray level brightness of the picture displayed by the display, and a gray level brightness of the picture displayed by the display screen are given by the following equation:

$$I'_{GL} = I_{GL} \times Tr_{GL} = I_{GL} \times f(I_{GL}) = \left(\frac{GL}{256}\right)^r \times I'_{L255} = \left(\frac{GL}{256}\right)^r \times I_{L255} \times Tr_{L255}$$

wherein, $I'_{GL}$ is the gray level brightness of the picture currently displayed by the display, $I_{GL}$ is the gray level brightness of the picture currently displayed by the display screen, $I'_{L255}$ is a brightness of a white picture displayed by the display, $I_{L255}$ is a brightness of the white picture displayed by the display screen, $Tr_{GL}$ is the transmittance of the photosensitive film, $Tr_{L255}$ is a transmittance of the photosensitive film corresponding to the white picture, $\gamma$ is a gamma value, and GL is a gray level value of the displayed picture.

In a possible implementation, the small organic molecular material is a liquid crystal material.

In a possible implementation, a thickness of the photosensitive film is not more than 100 um.

In still another embodiment described herein, a fabricating method of the display provided by the above embodiments comprises:

attaching the photosensitive film to a light emergent surface of the display screen using an adhesive tape or a bonding agent.

In a possible implementation, the fabricating method further comprises:

fixing a semi-transmission and semi-reflection mirror on the photosensitive film through a bonding agent or a framework.

In a possible implementation, a gray lever brightness of the picture displayed by the display is a product of the gray level brightness of the picture currently displayed by the display screen and the adjusted transmittance of the photosensitive film.

In a possible implementation, the brightness of the picture displayed by the display is obtained from the following equation:

$$I'_{GL} = I_{GL} \times Tr_{GL} = I_{GL} \times f(I_{GL}) = \left(\frac{GL}{256}\right)^r \times I'_{L255} = \left(\frac{GL}{256}\right)^r \times I_{L255} \times Tr_{L255}$$

wherein, $I'_{GL}$ is the gray level brightness of the picture currently displayed by the display, $I_{GL}$ is the gray level brightness of the picture currently displayed by the display screen, $I'_{L255}$ is a brightness of a white picture displayed by the display, $I_{L255}$ is a brightness of the white picture displayed by the display screen, $Tr_{GL}$ is the transmittance of the photosensitive film, $Tr_{L255}$ is a transmittance of the photosensitive film corresponding to the white picture, $\gamma$ is a gamma value, and GL is a gray level value of the displayed picture.

In a possible implementation, the material of the photosensitive film is a liquid crystal material.

In a possible implementation, a thickness of the photosensitive film is not more than 100 um In the display and the fabricating method thereof, and the fabricating method of a photosensitive film provided by the embodiments described herein, one layer of photosensitive film is added onto a light emergent surface of a display screen, and the photosensitive film can automatically adjust its transmittance according to the gray level brightness of a picture displayed by the display screen. Specifically, the transmittance decreases when the display displays a black picture so that the black picture is darker, and the photoactive substance in the photosensitive film changes to be transparent when the display displays any other picture, so as to increase the transmittance and ensure the normal displaying of the display. Thus, the contrast ratio of the display provided by the embodiments described herein can be increased, without changing the existing design, thereby improving the display effect of the display.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the drawings.

Figure 1:
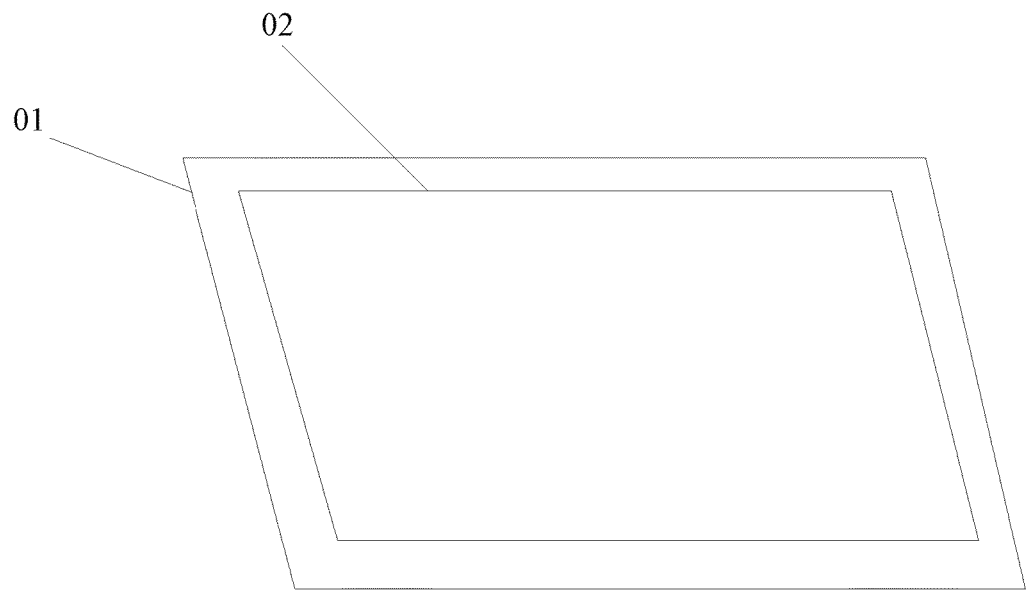
FIG. 1 is a structure diagram of an exemplary display.

An embodiment of the present disclosure provides a display, as illustrated in FIG. 1, comprising: a display screen 01 for displaying a picture, and a photosensitive film 02 attached to a light emergent surface of the display screen 01. The photosensitive film 02 is configured to automatically adjust its transmittance according to a gray level brightness of the picture displayed by the display screen 01, and the transmittance of the photosensitive film 02 increases with the increase of the gray level brightness of the picture displayed by the display screen 01.

To be noted, in the embodiment, as mentioned above and to be further described in details below, the gray level brightness of the picture displayed by the display screen refers to a gray level brightness of the picture currently displayed by the display screen before the picture is transmitted through the photosensitive film, also called as initial gray level brightness, while a gray level brightness of a picture displayed by the display refers to a gray level brightness after the picture currently displayed by the display screen is transmitted through the photosensitive film, i.e., a gray level brightness of the picture actually displayed by the display, also called as adjusted gray level brightness.

According to the display provided by the embodiments described herein, the light emergent surface of the display may be provided with one layer of photosensitive film, which can automatically adjust its transmittance according to a gray level brightness of the picture displayed by the display screen. Therefore, the photosensitivity of the photosensitive film can be utilized to automatically adjust the transmittance according to the picture displayed by the display, so as to increase the contrast ratio of the display.

Figure 2:
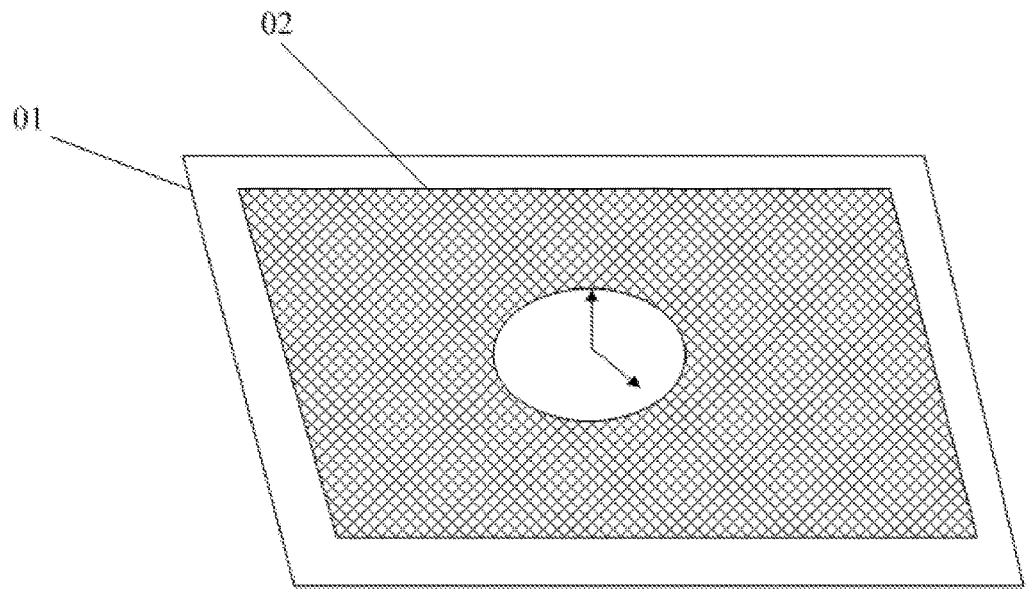
FIG. 2 is a schematic diagram when an exemplary display partially displays a picture.
Figure 3:
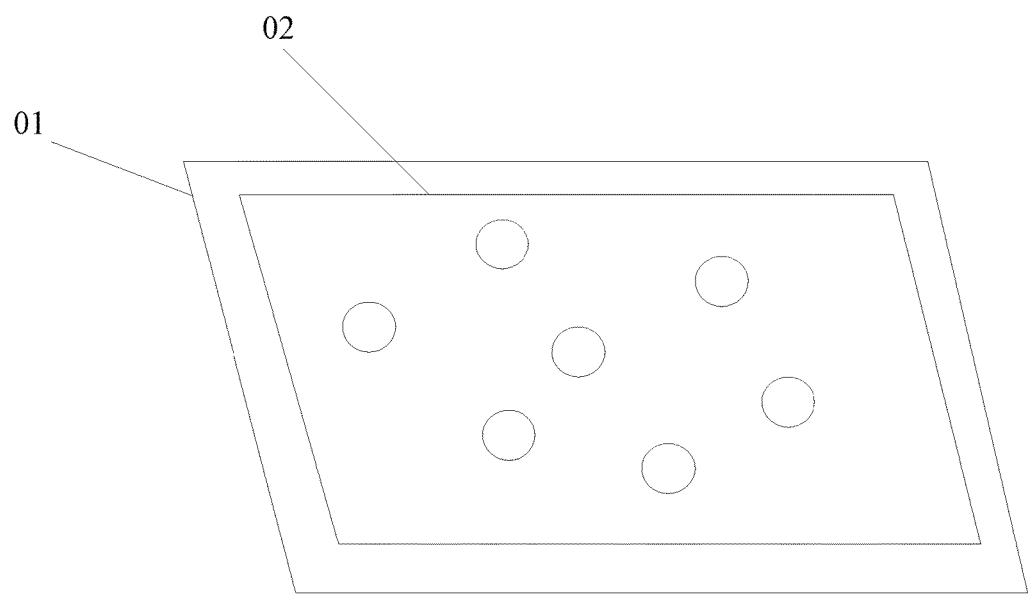
FIG. 3 is a schematic diagram when an exemplary display wholly displays a picture.

As illustrated in FIG. 2, in an example where the display displays a clock, during partial displaying, the brightness of the black area of the displayed picture can be decreased without influencing the display effect of other display area, that is, when the display partially displays the picture, the display area of the clock normally displays picture, and other area is a black picture area. At that time, the transmittance of visible light may be decreased in an area of the photosensitive film corresponding to the black picture area, so that the black picture area is darker. As illustrated in FIG. 3, in an example where the display displays other pictures, the photoactive substance in the photosensitive film changes and becomes transparent, which increases the transmittance and ensures the normal displaying of the display. Thus, the display provided by the embodiments described herein can increase the contrast ratio without changing the internal structure of the display, thereby improving the display effect of the display.

Figure 4:
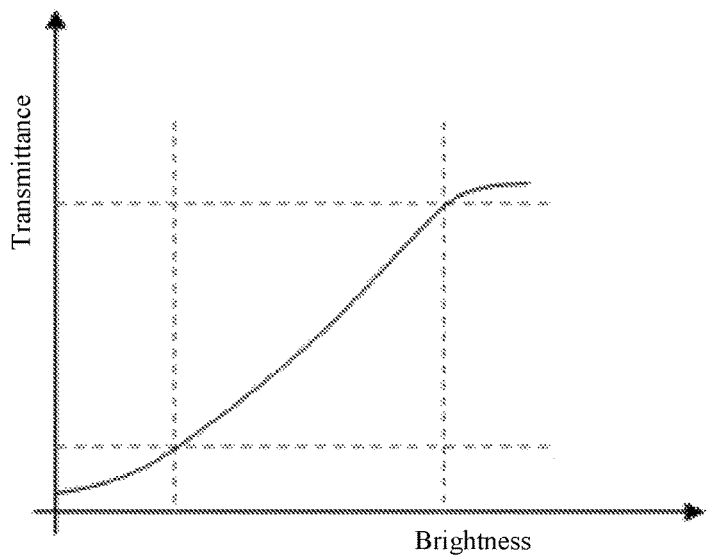
FIG. 4 is a curve graph of a relation between the transmittance of the photosensitive film and the gray level brightness of the picture displayed by the display screen.

FIG. 4 illustrates an example graph of a relation between the transmittance of the photosensitive film and the gray level brightness of the picture displayed by the display screen. As illustrated in FIG. 4, the transmittance of the photosensitive film increases with the increase of the picture displayed by the display screen. Specifically, when the display displays the black picture, the transmittance may be decreased so that the black picture is darker; and when the display displays any other picture, the photoactive substance in the photosensitive film changes and becomes transparent, which increases the transmittance and ensures the normal displaying of the display. Thus the contrast ratio of the display provided by the embodiments described herein can be increased just by adding one layer of photosensitive film on the light emergent surface of the display screen, without changing the existing design, thereby improving the display effect of the display.

In the display provided by the embodiments described herein, the brightness of the picture displayed by the display is a product of the gray level brightness of the picture currently displayed by the display screen and the adjusted transmittance of the photosensitive film.

As mentioned above, in the display provided by the embodiments of the present disclosure, the transmittance of the photosensitive film increases with the increase of the gray level brightness of the displayed picture. For example, the gray level of the displayed picture is divided into 0 to 255, i.e., the gray scale ranges from 0 to 255 during the transition from black to white. When the picture displayed by the display is a black picture, the transmittance of the photosensitive film corresponding to the black picture is $Tr_{L0}$, and the initial gray level brightness of the black picture is $I_{L0}$, then the gray level brightness of the black picture displayed by the display is $Tr_{L0}*I_{L0}$. When the picture displayed by the display is a gray level picture, the transmittance of the photosensitive film corresponding to the gray level picture is a function of the brightness of the picture displayed by the display screen (initial gray level brightness), i.e., $Tr_{GL}=f(I_{GL})$, and the initial gray level brightness of the gray level picture is $I_{GL}$, then the brightness of the gray level picture displayed by the display (the adjusted gray level brightness) is $f(I_{GL})*I_{GL}$. When the picture displayed by the display is a white picture, the transmittance of the photosensitive film corresponding to the white picture is $Tr_{L255}$, and the initial gray level brightness of the white picture is $I_{L255}$, then the brightness of the white picture displayed by the display is $I_{L255}*Tr_{L255}$. The brightness of the picture finally displayed by the display undergoes a gamma correction performed by a correction module included in the display. The specific process and principle of the correction are the same as those of the prior art, so it is not described in detail herein. The brightness of the picture finally displayed by the display after the gamma correction is obtained from the following equation:

$$I'_{GL} = I_{GL} \times Tr_{GL} = I_{GL} \times f(I_{GL}) = \left(\frac{GL}{256}\right)^\gamma \times I'_{L255} = \left(\frac{GL}{256}\right)^\gamma \times I_{L255} \times Tr_{L255}$$

wherein, $I'_{GL}$ is the gray level brightness of the picture currently displayed by the display, $I_{GL}$ is the gray level brightness of the picture currently displayed by the display screen, $I'_{L255}$ is a brightness of the white picture displayed by the display, $I_{L255}$ is a brightness of the white picture displayed by the display screen, $Tr_{GL}$ is the transmittance of the photosensitive film, $Tr_{L255}$ is a transmittance of the photosensitive film corresponding to the white picture, $\gamma$ is a gamma value, and GL is a gray level value of the displayed picture.

Through the brightness correction described above, the brightness of the picture displayed by the display can meet the requirement of human eye viewing, and improve the visual effect of the displayed picture.

In the display provided by the embodiments described herein, the material of the photosensitive film may be a liquid crystal material.

Specifically, in the display provided by the embodiments described herein, the photosensitive film may be made of a liquid crystal material that can include rigid and flexible groups. The rigid group ensures the molecules to be arranged in the ordering of the crystalloid to provide the property of anisotropy, and the flexible group enables the molecules to have the fluidity like liquid. The liquid crystal molecules generally have a "clear point", beyond which the liquid crystal molecules will lose the crystalline nature and no longer be anisotropic. Thus a photosensitive film having the photosensitive property can be achieved by selecting appropriate groups to construct molecules having the "liquid crystal" property and then catalyzing with photocatalyst of a visible light waveband. When the illumination of the visible light is low, the photosensitive film does not take place photochemical reaction and is anisotropic, which can prevent light transmission, thereby decreasing the transmittance. After the illumination is increased, the groups of the liquid crystal molecules are isomerized by the catalysis of the catalyst, so that the liquid crystal molecules no longer have the liquid crystal property and lose anisotropy, thus the light can be transmitted through, thereby increasing the transmittance. As a result, the photosensitive film made of a liquid crystal material has a photosensitive characteristic that the transmittance increases with the increase of the brightness. Of course, the photosensitive film may also be made of other photosensitive material having the photosensitive characteristic that the transmittance increases with the increase of the brightness, which is not limited herein.

As mentioned above, the photosensitive film is made of a liquid crystal material and has the photosensitive characteristic under the effect of the photocatalyst through visible light irradiation. Specifically, in the displays provided by the embodiments described herein, the photosensitive film may be made of a liquid crystal material, and the molecular structure may be controlled by adjusting the reaction speed and condition of the photocatalyst, so as to form a photosensitive film meeting the required illumination-transmittance curve. By applying such a photosensitive film to the display, the contrast ratio of the display can be increased, and the visual effect of the displayed picture can be improved.

In one example, the thickness of the photosensitive film may be set as not larger than 100 um. Since the thickness of the photosensitive film is micron-sized and negligible relative to the thickness and weight of the display, it is beneficial to add the photosensitive film on the basis of the original product design, without influencing the other structure design and use effect of the original product.

In one embodiment, the photosensitive film may be attached to the light emergent surface of the display screen through an adhesive tape or a bonding agent. It will be appreciated that the photosensitive film can also be attached to the light emergent surface of the display screen (i.e., the light emergent surface of the display area of the display screen) in any other implementable manner. As mentioned above, in this embodiment, when the photosensitive film is attached to the light emergent surface of the display screen, the contrast ratio of the display can be increased by using the photosensitive characteristic of the photosensitive film, thereby improving the visual effect of the picture displayed by the display.

Figure 5:
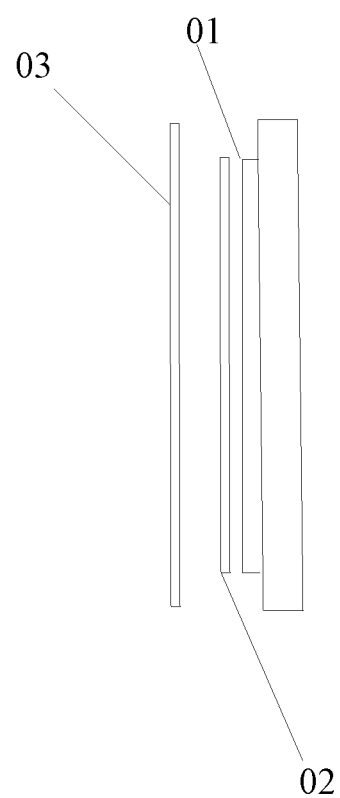
FIG. 5 is a structure diagram of an exemplary display with a semi-transmission and semi-reflection mirror.

As illustrated in FIG. 5, the display may further comprise a semi-transmission and semi-reflection mirror 03 fixed on the photosensitive film 02. In the display provided by the embodiment described herein, the semi-transmission and semi-reflection mirror may be combined with the display having a photosensitive film, so as to realize the function of the on-board rearview mirror. Specifically, a "pixel level" light control effect can be achieved by attaching the photosensitive film to the surface of the display. In the case of a local displaying, the light transmitted by the black picture can be blocked by the photosensitive film without influencing the display effect, and the user will not be hindered from viewing the conditions behind the vehicle through the reflection mirror, thereby ensuring the traffic safety. In addition, the semi-transmission and semi-reflection mirror can reduce the influence on the photosensitive film from the ambient light.

In the above display provided by the embodiments described herein, the semi-transmission and semi-reflection mirror is fixed on the photosensitive film through a bonding agent or a framework. Of course, other fixing manner is also possible. The function of the on-board rearview mirror display may be achieved by combining the semi-transmission and semi-reflection mirror with the display.

In one example, the display provided by the embodiment described herein can be used as the on-board rearview mirror display. With the improvement of the scientific and technological level, the on-board display technique is continuously developed, the demand on the on-board display in vehicles increasingly rises, and the on-board rearview mirror display has become a configuration for high-end vehicles. Since the display provided by the embodiments described herein has a high contrast ratio, it can be used as the vehicle rearview mirror display. Of course, it may also be applied to other high-end display devices requiring a high contrast ratio. When locally displaying a picture, the display having a high contrast ratio can display a picture strikingly different from the non-display picture area around, i.e., the black picture area, thus the displayed picture is clearer, which is helpful to improve the visual effect of the displayed picture. In another example, the display provided by the embodiments described herein can be used as a clock display, so that the clock picture is clearer, which facilitates the user to clearly view the displayed time.

Based on the same disclosure conception, the embodiment of the present disclosure further provides a fabricating method of a photosensitive film for the display provided by the above embodiment, comprising: forming the photosensitive film with a small organic molecular material including rigid and flexible groups, wherein a transmittance of the photosensitive film increases with the increase of a gray level brightness of a picture displayed by a display screen under the effect of photocatalyst. Specifically, by irradiating the small organic molecular material with visible light and then catalyzing with photocatalyst of a visible light waveband, such a photosensitive film can be achieved: when the illumination of the visible light is low, the photosensitive film does not take place photochemical reaction and is anisotropic, which can prevent light transmission, thereby decreasing the transmittance; after the illumination is increased, the groups of the molecules are isomerized by the catalysis of the catalyst, so that the small organic molecules no longer have the liquid crystal property and lose anisotropy, thus the light can be transmitted through, thereby increasing the transmittance. Therefore, the contrast ratio of the display can be increased by applying the photosensitive film to the display.

The present disclosure further provides a fabricating method of the display described in above embodiments. The fabricating method comprises: attaching the photosensitive film to a light emergent surface of a display screen using an adhesive tape or a bonding agent. Specifically, in the embodiment, the photosensitive film can be attached to the light emergent surface of the display screen using an adhesive tape or a bonding agent. Of course, it is also possible that other implementable manner may be used to attach the photosensitive film to the light emergent surface of the display area of the display, such that the photosensitive characteristic of the photosensitive film can be utilized to increase the contrast ratio of the display, and to improve the visual effect of the picture displayed by the display.

The fabricating method of the display described in above embodiments may further comprise: fixing a semi-transmission and semi-reflection mirror on the photosensitive film through a bonding agent or a framework. The function of on-board rearview mirror display can be realized by combining the semi-transmission and semi-reflection mirror with the display through a bonding agent or a framework. In the case of a local displaying, the light transmitted by the black picture can be blocked by the photosensitive film without influencing the display effect, and the user will not be hindered from viewing the conditions behind the vehicle through the reflection mirror, thereby ensuring the traffic safety. Of course, the semi-transmission and semi-reflection mirror may also be combined with the display in other fixing manner to realize the function of the on-board rearview mirror display, which is not limited herein.

To be noted, when the elements and the embodiments of the present disclosure are introduced, the articles "an", "a", "the" and "said" intend to indicate the presence of one or more elements.

The expressions "have", "comprise", "include" and their grammatic varieties are used in a non-exclusive manner. Thus the expressions "A has B", "A comprises B" and "A includes B" all indicate a fact that besides B, A further may include one or more additional components and/or constitute elements and a condition that besides B, any other component, constitute element or member is not presented in A.

The drawings could exaggerate the sizes of the layers and areas for clear illustrations. In addition, it should be understood that when an element or layer is referred to as being "above" another element or layer, it may be directly located on other element, or there may be an intermediate layer; when an element or layer is referred to as being "below" another element or layer, it may be directly located under other element, or there may be one or more intermediate layers or elements; and when an element or layer is referred to as being "between" two layers or elements, it may be an unique layer between the two layers or elements, or there may be one or more intermediate layers or elements.

The foregoing description of the embodiments has been provided for purpose of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are included within the scope of the disclosure.

The invention claimed is:

1. A display, comprising:
 a display screen for displaying a picture; and
 a photosensitive film disposed on a light emergent surface of the display screen, the photosensitive film configured to automatically adjust its corresponding transmittance according to a gray level brightness of the picture displayed by the display screen, with the transmittance of the photosensitive film increasing with an increase of the gray level brightness of the picture displayed by the display screen, the photosensitive film comprising a small organic molecular material including rigid and flexible groups, and transmittance of the small organic molecular material increasing with an increase of the gray level brightness of the picture displayed by the display screen under the effect of a photocatalyst.

2. The display according to claim 1, wherein a gray level brightness of a picture displayed by the display is a product of the gray level brightness of the picture displayed by the display screen and the adjusted transmittance of the photosensitive film.

3. The display according to claim 2, wherein the brightness of the picture displayed by the display is obtained from the following equation:

$$I'_{GL} = I_{GL} \times Tr_{GL} = I_{GL} \times f(I_{GL}) = \left(\frac{GL}{256}\right)^{\gamma} \times I'_{L255} = \left(\frac{GL}{256}\right)^{\gamma} \times I_{L255} \times Tr_{L255}$$

where $I'_{GL}$ is the gray level brightness of the picture displayed by the display, $I_{GL}$ is the gray level brightness of the picture displayed by the display screen, $I'_{L255}$ is a brightness of a white picture displayed by the display, $I_{L255}$ is a brightness of a white picture displayed by the display screen, $Tr_{GL}$ is the transmittance of the photosensitive film, $Tr_{L255}$ is a transmittance of the photosensitive film corresponding to the white picture displayed by the display screen, $\gamma$ is a gamma value, and GL is a gray level value of the picture displayed by the display screen.

4. The display according to claim 1, wherein the small organic molecular material comprises a liquid crystal material.

5. The display according to claim 1, wherein a thickness of the photosensitive film is not more than 100 um.

6. The display according to claim 1, wherein the photosensitive film is attached to the light emergent surface of the display screen through an adhesive tape or a bonding agent.

7. The display according to claim 1, further comprising a semi-transmission and semi-reflection mirror fixed on the photosensitive film.

8. The display according to claim 7, wherein the semi-transmission and semi-reflection mirror is fixed on the photosensitive film through a bonding agent or a framework.

9. The display according to claim 1, wherein the display is an on-board rearview mirror display or a clock display.

10. A method of fabricating a photosensitive film for a display, the display including a display screen for displaying a picture, and the photosensitive film disposed on a light emergent surface of the display screen, the photosensitive film configured to automatically adjust its corresponding transmittance according to a gray level brightness of the picture displayed by the display screen, with the transmittance of the photosensitive film increasing with an increase of the gray level brightness of the picture displayed by the display screen, the method comprising:
 forming the photosensitive film with a small organic molecular material including rigid and flexible groups, wherein a transmittance of the small organic molecular material increases with an increase of the gray level brightness of the picture displayed by the display screen of the display under the effect of a photocatalyst.

11. The fabricating method according to claim 10, wherein relations among the transmittance of the photosensitive film, a gray level brightness of a picture displayed by the display, and the gray level brightness of the picture displayed by the display screen, are given by the following equation:

$$I'_{GL} = I_{GL} \times Tr_{GL} = I_{GL} \times f(I_{GL}) = \left(\frac{GL}{256}\right)^{\gamma} \times I'_{L255} = \left(\frac{GL}{256}\right)^{\gamma} \times I_{L255} \times Tr_{L255}$$

where $I'_{GL}$ is the gray level brightness of the picture displayed by the display, $I_{GL}$ is the gray level brightness of the picture displayed by the display screen, $I'_{255}$ is a brightness of a white picture displayed by the display, $I_{255}$ is a brightness of a white picture displayed by the display screen, $Tr_{GL}$ is the transmittance of the photosensitive film, $Tr_{L255}$ is a transmittance of the photosensitive film corresponding to the white picture displayed by the display screen, $\gamma$ is a gamma value, and GL is a gray level value of the picture displayed by the display screen.

12. The fabricating method according to claim 10, wherein the small organic molecular material comprises a liquid crystal material.

13. The fabricating method according to claim 10, wherein a thickness of the photosensitive film is not more than 100 um.

14. A method of fabricating a display, the display comprising a display screen for displaying a picture, and a photosensitive film disposed on a light emergent surface of the display screen, the photosensitive film configured to automatically adjust its corresponding transmittance according to a gray level brightness of the picture displayed by the display screen, with the transmittance of the photosensitive film increasing with an increase of the gray level brightness of the picture displayed by the display screen, the photosensitive film comprising a small organic molecular material including rigid and flexible groups, and transmittance of the small organic molecular material increasing with an increase of the gray level brightness of the picture displayed by the display screen under the effect of a photocatalyst, the method comprising:

attaching the photosensitive film to the light emergent surface of the display screen using an adhesive tape or a bonding agent.

15. The method of fabricating the display according to claim 14, further comprising:

fixing a semi-transmission and semi-reflection mirror on the photosensitive film through a bonding agent or a framework.

16. The method of fabricating the display according to claim 14, wherein a gray level brightness of a picture displayed by the display is a product of the gray level brightness of the picture displayed by the display screen and the adjusted transmittance of the photosensitive film.

17. The method of fabricating the display according to claim 16, wherein the brightness of the picture displayed by the display is obtained from the following equation:

$$l'_{GL} = I_{GL} \times Tr_{GL} = I_{GL} \times f(I_{GL}) = \left(\frac{GL}{256}\right)^r \times l'_{L255} = \left(\frac{GL}{256}\right)^r \times I_{L255} \times Tr_{L255}$$

where $l'_{GL}$ is the gray level brightness of the picture displayed by the display, $I_{GL}$ is the gray level brightness of the picture displayed by the display screen, $l'_{L255}$ is a brightness of a white picture displayed by the display, $I_{L255}$ is a brightness of a white picture displayed by the display screen, $Tr_{GL}$ is the transmittance of the photosensitive film, $Tr_{L255}$ is a transmittance of the photosensitive film corresponding to the white picture displayed by the display screen, $\gamma$ is a gamma value, and GL is a gray level value of the picture displayed by the display screen.

18. The method of fabricating the display according to claim 14, wherein the photosensitive film comprises a liquid crystal material.

19. The method of fabricating the display according to claim 14, wherein a thickness of the photosensitive film is not more than 100 um.

* * * * *